CRYSTAL HOLDER

Filed Jan. 26, 1946 2 Sheets-Sheet 1

INVENTOR.
LESTER C. VIA
BY John J. Hanrahan
ATTORNEY

Feb. 21, 1950 L. C. VIA 2,497,966

CRYSTAL HOLDER

Filed Jan. 26, 1946 2 Sheets-Sheet 2

INVENTOR.
LESTER C. VIA
BY John A. Hanrahan
ATTORNEY

Patented Feb. 21, 1950

2,497,966

UNITED STATES PATENT OFFICE 2,497,966

CRYSTAL HOLDER

Lester C. Via, Carlisle, Pa., assignor, by mesne assignments, to Reeves Hoffman Corporation, Carlisle, Pa., a corporation of Pennsylvania Application January 26, 1946, Serial No. 643,773

19 Claims. (Cl. 171—327)

This invention relates to new and useful improvements in oscillators and has particular relation to the so-called postage-stamp type of crystal holder.

An object of the invention is to provide an oscillator comprising a piezoelectric crystal or oscillator element together with a holder, the assembly being of simple and inexpensive construction and yet highly durable and efficient for the purpose intended.

A further object is to provide an oscillator wherein the air gap between the oscillating crystal and the electrodes is controlled by lapping of the faces of an insulator rather than by the use of adjusting screws as heretofore.

Other objects and advantages of the invention will becomes apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings—

Figure 1:
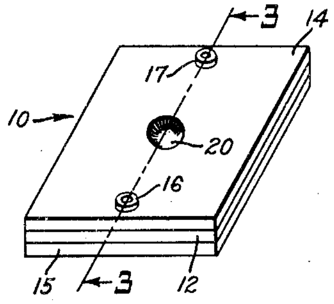
Fig. 1 is an isometric view showing an oscillator made in accordance with the invention.
Figure 2:
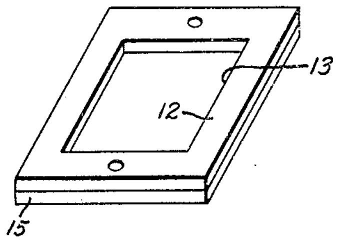
Fig. 2 is a similar view but with the upper electrode removed and the piezoelectric crystal omitted.
Figure 3:
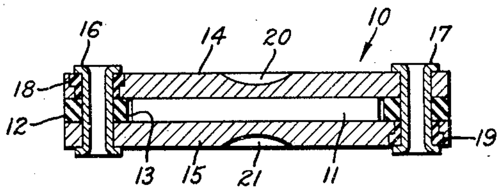
Fig. 3 is an enlarged sectional view taken as along the plane of the line 3—3 of Fig. 1.

Referring in detail to the drawings, and at first more particularly to Figs. 1 through 5, at 10 is generally indicated the complete oscillator including or mounting a piezoelectric crystal 11, as for example, a quartz wafer. The mounting or holder for the crystal 11 comprises an open frame-like insulator 12 shown in the drawings as a flat rectangular frame having an opening 13 therethrough. Opening 13 receives the crystal 11 and disposed against the opposite faces of the frame 12 and thus at opposite sides of the crystal 11 are similar electrodes 14 and 15.

As shown, the electrodes 14 and 15 are of the same outside dimension and the outside dimensions of the electrodes are the same as those of the insulator 12. Thus, when the electrodes are disposed against the respective faces of the insulator the outer edges of all three parts are flush or substantially so and a laminated or sandwich-like structure is provided. The said three parts are held in the described relation by means of a pair of tubular rivets 16 and 17. For the accommodation of these rivets the parts are manufactured with openings which register when the parts are assembled as described and the rivets are then passed through such openings and spun over drawing the electrodes tightly against the respective faces of the insulator.

To avoid having the rivets 16 and 17 short circuit the electrodes, rivet 16 is insulated from electrode 14 by a collar-like insert or bushing 18 of any suitable insulating material and to the same end a similar collar-like insert or bushing 19 insulates the rivet 17 from the electrode 15. In their outer surfaces the electrodes 14 and 15 are provided with centrally located irregularities here shown as comprising socket-like depressions 20 and 21 respectively.

In order that a close fit will be obtained between the inner faces of the electrodes and the respective faces of the insulator 12, both faces of the insulator and the inner faces of the electrodes are lapped to insure parallelism. This lapping of the faces of the insulator also provides a method for controlling the air gap between the oscillator or crystal 11 and the electrodes 14 and 15. In one oscillator made in accordance with the invention the insulator was lapped to a thickness wherein it is .0005 of an inch thicker than the thickness of the crystal or oscillator 11. The opening 13 in the insulator is of such size as to snugly receive the piezoelectric crystal being preferably of such size as to allow a clearance of approximately .005 of an inch at each edge of the crystal.

With the faces of the insulator lapped as above described and the same treatment accorded the inner faces of the electrodes, it will be clear that when the electrodes are clamped against the faces of the insulator by the hollow rivets 16 and 17 or by other means used for the same purpose, there will be a nearly perfect fit between the faces of the insulator and the inner faces of the electrodes so that continuous contact over all or substantially all of the opposed areas of such parts will be established. This insures an air-tight or substantially airtight enclosure about the crystal 11. Further, as the insulator is lapped to the desired thickness, the lapping operation provides a method of control of the air gap between the electrodes and the crystal and there is no occasion for any adjustable mounting, elaborate or otherwise, of either or both of the electrodes.

The complete oscillator as described may be used in a variety of ways and of course the crystal 11 will be the desired cut, size, etc. for any particular application.

Figure 5:
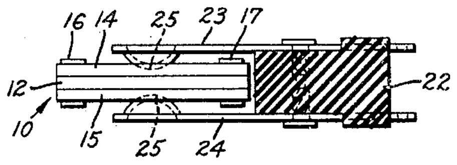
Fig. 5 is a sectional view taken as along the line 5—5 of Fig. 4.
Figure 4:
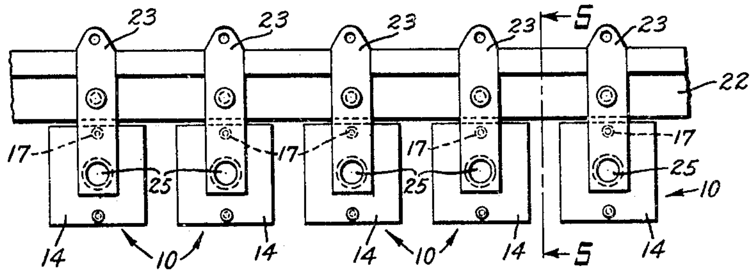
Fig. 4 is a plan view suggesting one manner of use of the oscillator of Figs. 1, 2 and 3.

Figs. 4 and 5 suggest a method of use of the oscillator 10 and in said figures a mounting bar 22, shown as of insulating material, carries pairs of contact straps or fingers 23 and 24 of which the fingers 23 are disposed in vertically spaced relation above the fingers 24. The oscillators 10 are mounted simply by snapping them between a pair of the spring contact fingers which preferably are provided with bowed or bulged portions 25 to snap into the depressions or sockets 20 and 21 in the respective electrodes 14 and 15. In this way contact is established between the fingers 23 and 24 and the respective electrodes of the oscillator and any suitable switch means (not shown) may be used for connecting any selected one of the oscillators into a circuit.

Figure 6:
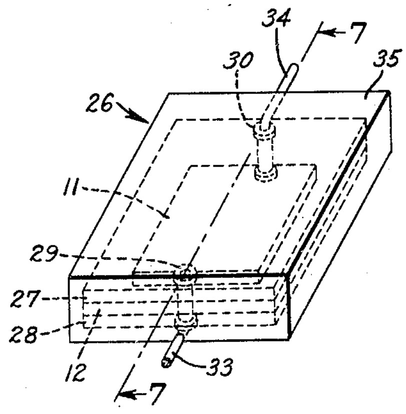
Fig. 6 is a view similar to Fig. 1 but showing a modified construction.
Figure 7:
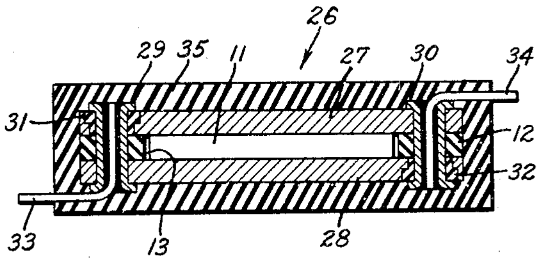
Fig. 7 is an enlarged sectional view taken as along the line 7—7 of Fig. 6.

Referring now to Figs. 6 and 7, a slightly different construction of oscillator is there generally designated 26. Oscillator 26 includes the open frame-like insulator 12 receiving the piezoelectric crystal 11 and disposed between electrodes 27 and 28. Electrodes 27 and 28 are of the same construction as electrodes 14 and 15 with the exception that the irregularities or depressions 20 and 21 of electrodes 14 and 15 are omitted from the electrodes 27 and 28. Electrodes 27 and 28 are clamped against opposite faces of the insulator 12 by hollow rivets 29 and 30 corresponding with rivets 16 and 17 and insulated from the electrodes 27 and 28 respectively by the collars or bushings 31 and 32 respectively.

From the foregoing it will be seen that the insulator, crystal, electrodes and rivets of the oscillator of Figs. 6 and 7 are substantially identical with the corresponding parts of the figures first described. However, in the modification, leads or "rat-tails" 33 and 34 are soldered to or in the hollow rivets 29 and 30 respectively and are then carried across the respective surface edge portions of the electrodes 28 and 27 and project beyond the edges of the assembly.

The entire oscillator structure of Figs. 6 and 7 as thus far described is now placed in a suitable mold and has an integral casing 35 of insulating material molded thereabout. This integral casing 35 may in actual practice be approximately 1/32 of an inch in thickness but is an integral structure and is highly water or moisture resistant and preferably is wholly moisture proof. Further, this casing is of an electrical insulating material.

Figure 8:
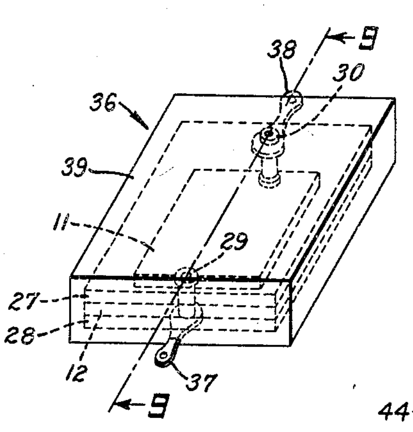
Fig. 8 is a view similar to Fig. 6 but showing another modification.
Figure 9:
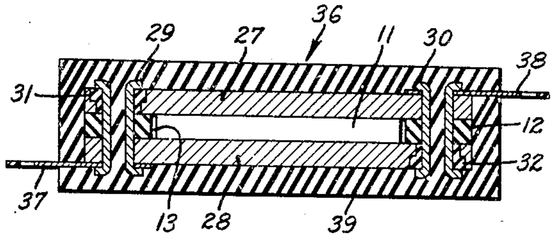
Fig. 9 is an enlarged sectional view taken as along the line 9—9 of Fig. 8.

In the modification of Figs. 8 and 9 the oscillator is generally designated 36 and in this modified structure the insulator 12, the electrodes 27 and 28, piezoelectric crystal 11, the hollow rivets 29 and 30 and the insulating collars or bushings 31 and 32 are again employed. The only difference between the structure of the oscillator 36 and that of the oscillator 26 consists in the omission of the "rat-tails" or leads 33 and 34 and the clamping in place of a pair of attachment or contact lugs 37 and 38 by the rivets 29 and 30.

With special reference to Fig. 9 it will be noted that the inner end of lug 37 is clamped directly against electrode 28 by the rivet 29 and that the inner end portion of the lug 38 is clamped directly against the electrode 27 by the rivet 30. Thus, in addition to securing the insulator and the electrodes together the rivets 29 and 30 function to mount the lugs 37 and 38 and to insure a good electrical connection between said lugs and the respective electrodes.

After the assembly thus far described has been made, it is placed within a suitable mold and an integral casing 39 is molded thereabout. The casing 39 corresponds with casing 35 of Figs. 6 and 7 and in addition to enclosing the insulator 12 and the electrodes 27 and 28, encloses the end portions of the rivets and the inner portions of the lugs 37 and 38. This casing is highly water and moisture resistant or entirely moisture proof and is of electrical insulating material.

Figure 11:
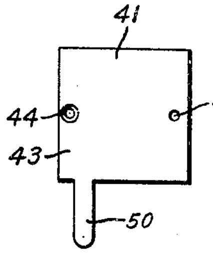
Fig. 11 is a similar view showing a combined electrode and contact prong used in the oscillator of Fig. 10.
Figure 12:
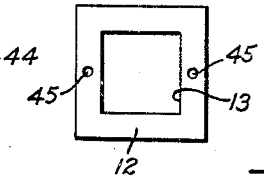
Fig. 12 is a similar view of an open frame-like insulator employed in the modified construction.
Figure 13:
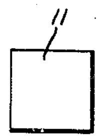
Fig. 13 is a plan view of the piezoelectric crystal employed.

Referring now to the modification illustrated in Figs. 10 through 16, the oscillator there shown is generally designated 40 and as shown comprises the open frame-like insulator 12, the piezoelectric crystal 11 and a pair of electrodes 41 and 42. Electrodes 41 and 42 are identical and as best shown in Fig. 11, each comprises a body portion 43 of the size and configuration of the insulator 12 and provided with a pair of openings 44 adapted to align with the openings 45 of the insulator when a pair of the bodies 43 are assembled one against each face of the insulator. At such times hollow rivets 46 and 47 are passed through the registering openings and spun over so as to clamp the body portions 43 of the electrodes against the respective faces of the insulator 12. Rivet 46 is insulated from electrode 41 by a collar or bushing 48 and is in electrical contact with the electrode 42 while rivet 47 is insulated from electrode 42 by a collar or bushing 49 and is in electrical engagement with the electrode 41. This is substantially the structure previously described.

Figure 10:
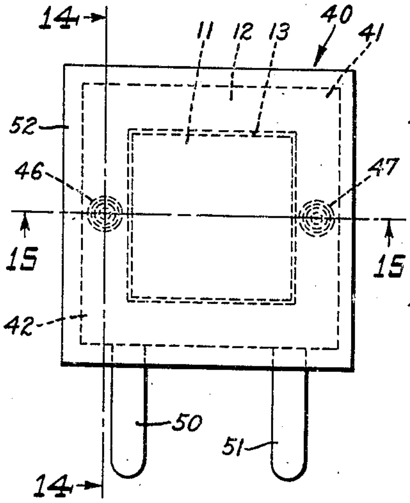
Fig. 10 is a plan view showing a further modification.
Figure 14:
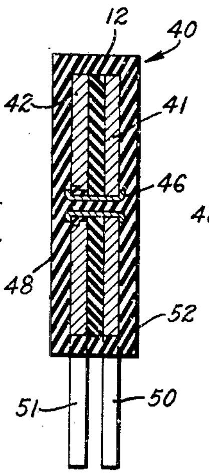
Fig. 14 is an enlarged sectional view taken as along the line 14—14 of Fig. 10.
Figure 15:
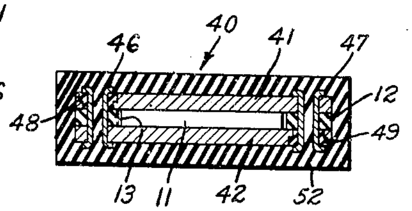
Fig. 15 is a sectional view at right angles to Fig. 14, the said view taken as along the line 15—15 of Fig. 10.
Figure 16:
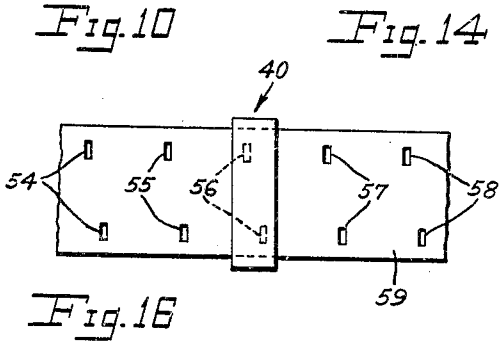
Fig. 16 is an elevational view illustrating a manner of use of the oscillator of Figs. 10, 14 and 15.

Essentially the difference between the oscillator 40 and those previously described resides in the fact that the electrodes 41 and 42 in addition to the body portions 43 are each blanked out with an integral leg portion. In the drawings such leg portions of the electrodes 41 and 42 are designated 50 and 51 respectively. The electrodes are of identical construction as above stated but in the assembly they are arranged in reversed relation so that the distance between the leg portions 50 and 51, comprising contact prongs, as shown in Fig. 10 is the center distance between the entrances to a socket or receptacle.

After the various parts have been assembled as described, the assembly is placed in a suitable mold and integral casing 52 is molded thereabout.

This casing is of the material and for the purpose above suggested with respect to the casings 35 and 39 of oscillators 26 and 36 respectively. Casing 52 completely encloses the body portions of the electrodes and the insulator 12 and also encloses the inner portions of the contact prongs 50 and 51. An oscillator of the type herein designated 40 might well be employed in constructions such as that shown in Fig. 16 wherein multiple receptacle openings 54, 55, 56, 57 and 58 are shown in the body 59. The entrances 54 through 58 are arranged to receive the prongs 50 and 51 of the oscillator 40.

In the various oscillators herein disclosed it will be understood that the piezoelectric crystals are of any desired cut and of any desired dimension. The insulator 12 is in each instance lapped to the proper thickness. Additionally, the electrodes employed are of the size and configuration depending upon the size and configuration of the insulator. In connection with the insulator it is pointed out that the same may be of any suitable resin or of glass or the like or other insulating material and may be molded or blanked to approximately the correct shape from a sheet and thereafter lapped to the exact dimension required.

Additionally, as pointed out, the integral casings 35, 39 and 47 of the forms shown in Figs. 6 through 16 may be from any suitable material. The casings are molded up of a resin or the like and while there is considerable choice of material from which the casings may be made it is highly important that they be molded of a tough material and particularly that they be molded of a material which is highly moisture resistant and preferably is wholly moisture proof. These attributes are highly desirable if not essential in addition to the requirement that the molded casing be of an electrical insulating material.

Having thus set forth the nature of my invention, what I claim is:

1. An oscillator comprising an open frame-like one-piece insulator, a piezoelectric oscillator in the opening in said insulator of less thickness than the thickness of said insulator, a rigid electrode against each face of said insulator, said insulator on its faces and said electrodes on their inner faces lapped for a close flat fit of such faces of the electrodes on the faces of the insulator, and means clamping said electrodes and insulator together.

2. An oscillator comprising an open frame-like one-piece insulator, a piezoelectric oscillator in the opening in said insulator, a rigid electrode against each face of said insulator, said insulator on its faces and said electrodes on their inner faces lapped for a close flat fit of such faces of the electrodes on the faces of the insulator, and at least a pair of spaced securing means passing through spaced edge portions of said electrodes and said insulator and securing such parts together.

3. An oscillator comprising an open frame-like one-piece insulator, a piezoelectric oscillator in the opening in said insulator, a rigid electrode against each face of said insulator, said insulator on its faces and said electrodes on their inner faces lapped for a close flat fit of such faces of the electrodes on the faces of the insulator, at least a pair of spaced metallic securing means passing through spaced edge portions of said electrodes and said insulator and securing such parts together, and means insulating one of said securing means from one of said electrodes and the other securing means from the other of said electrodes.

4. An oscillator comprising an open frame-like one-piece insulator, a piezoelectric oscillator in the opening in said insulator of less thickness than the thickness of said insulator, a rigid electrode against each face of said insulator, said insulator on its faces and said electrodes on their inner faces lapped for a close flat fit of such faces of the electrodes on the faces of the insulator, and means clamping said electrodes and insulator together, and each of said electrodes having a substantially centrally located depression in its outer side for reception of a portion of a contact clip.

5. An oscillator comprising an open frame-like one-piece insulator, a piezoelectric oscillator in the opening in said insulator of less thickness than the thickness of said insulator, a rigid electrode against each face of said insulator, said insulator on its faces and said electrodes on their inner faces lapped for a close flat fit of such faces of the electrodes on the faces of the insulator, and means clamping said electrodes and insulator together, and each of said electrodes having a substantially centrally located irregularity on its outer side for cooperation with a spring contact clip.

6. An oscillator comprising an open frame-like one-piece insulator, a piezoelectric oscillator in the opening in said frame-like insulator and substantially filling the same, a rigid electrode against each face of said insulator, at least a pair of spaced metallic securing means passing through spaced edge portions of said electrodes and said insulator and securing such parts together, means insulating one of said securing means from one of said electrodes and the other securing means from the other electrode, and separate leads connected with the respective spaced metallic securing means.

7. An oscillator comprising an open frame-like one-piece insulator, a piezoelectric oscillator in the opening in said frame-like insulator and substantially filling the same, a rigid electrode against each face of said insulator, at least a pair of spaced metallic securing means passing through spaced edge portions of said electrodes and said insulator and securing such parts together, means insulating one of said securing means from one of said electrodes and the other securing means from the other electrode, and separate contact lugs clamped against the outer faces of the respective electrodes by the metallic securing means contacting such electrodes.

8. An oscillator comprising an open frame-like one-piece insulator, a piezoelectric oscillator in the opening in said frame-like insulator, a rigid electrode against each face of said insulator, means clamping said electrodes and insulator together, a pair of contact lugs, and said clamping means securing the respective contact lugs to the respective electrodes.

9. An oscillator comprising an open frame-like one-piece insulator, a piezoelectric oscillator in the opening in said frame-like insulator and substantially filling the same, a rigid electrode against each face of said insulator, at least a pair of spaced metallic securing means passing through spaced edge portions of said electrodes and said insulator and securing such parts together, means insulating one of said securing means from one of said electrodes and the other securing means from the other electrode, a contact prong integral with each of said electrodes, and said contact prongs extending from the same edge of the assembled oscillator in spaced substantially parallel relation.

10. An oscillator comprising an open frame-like one-piece insulator, a piezoelectric oscillator in the opening in said insulator, a rigid electrode against each face of said insulator, said insulator on its faces and said electrodes on their inner faces lapped for a close flat fit of such faces of the electrodes on the faces of the insulator, means clamping said electrodes and insulator together, a contact prong integral with each of said electrodes, and said contact prongs extending from the same edge of the assembled oscillator in spaced substantially parallel relation.

11. An oscillator comprising an open frame-like one-piece insulator, a piezoelectric oscillator in the opening in said insulator, a pair of rigid electrodes each comprising a body portion of the shape of said insulator and an integral leg portion comprising a contact prong, and said electrodes arranged with their respective body portions against the respective faces of said insulator and their leg portions extending in the same direction and in substantially parallel relation.

12. An oscillator comprising an open frame-like one-piece insulator, a piezoelectric oscillator in the opening in said insulator, a pair of identical rigid electrodes each comprising a body portion of the shape of said insulator and an integral leg portion comprising a contact prong, and said electrodes arranged with their respective body portions against the respective faces of said insulator and their leg portions extending in the same direction and in substantially parallel relation.

13. The oscillator as in claim 1 wherein the assembly of the insulator, electrodes and clamping means are enclosed in an integral casing of insulating material.

14. The oscillator as in claim 6 wherein the assembly of the insulator, electrodes, metallic securing means and the inner portions of said leads are enclosed in an integral casing of insulating material.

15. The oscillator as in claim 8 wherein the assembly of the insulator, electrodes, clamping means and the inner portions of said lugs are enclosed in an integral casing of insulating material.

16. The oscillator as in claim 11 wherein the assembly comprising the insulator, the body portions of the electrodes, and the inner portions of said legs are enclosed in an integral casing of insulating material.

17. The step in the method of making the oscillator including an open frame-like insulator having a piezo electric oscillator therein and electrodes against each face thereof and secured thereto, comprising controlling the air gap between the piezo electric oscillator and the electrodes by lapping the frame-like insulator to a desired thickness in excess of the thickness of said piezo electric oscillator.

18. An oscillator comprising an open frame-like one-piece insulator, a piezo electric oscillator in the opening in said frame-like insulator of less thickness than the thickness of said insulator and substantially filling said opening, a rigid electrode against each face of said insulator, means clamping said electrodes and insulator together, and an integral casing of insulating material enclosing said insulator, electrodes and clamping means.

19. An oscillator comprising an open frame-like one-piece insulator, a piezo electric oscillator in the opening in said frame-like insulator of less thickness than the thickness of said insulator and substantially filling said opening, a rigid electrode against each face of said insulator, means clamping said electrodes and insulator together, and an integral casing of moisture resistant electric insulating material enclosing the assembly comprising said insulator, electrodes and clamping means.

LESTER C. VIA.

REFERENCES CITED

The following references are of record in the file of this patent:

UNITED STATES PATENTS

| Number | Name | Date |
|---|---|---|
| 1,783,132 | Ohl | Nov. 25, 1930 |
| 1,908,320 | Conklin | May 9, 1933 |
| 1,933,735 | Hund | Nov. 7, 1933 |
| 1,959,827 | Hyland | May 22, 1934 |
| 2,070,732 | Holden | Feb. 16, 1937 |
| 2,247,627 | Atwood et al. | July 1, 1941 |
| 2,264,692 | Gerber | Dec. 2, 1941 |
| 2,399,908 | Bokovoy | May 7, 1946 |
| 2,399,919 | Garrison | May 7, 1946 |